United States Patent
Kato et al.

(10) Patent No.: US 7,471,186 B2
(45) Date of Patent: Dec. 30, 2008

(54) RADIO REMOTE CONTROL SYSTEM

(75) Inventors: Keiji Kato, Nagoya (JP); Ikuro Adachi, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 632 days.

(21) Appl. No.: 11/127,740

(22) Filed: May 12, 2005

(65) Prior Publication Data

US 2005/0253682 A1 Nov. 17, 2005

(30) Foreign Application Priority Data

May 13, 2004 (JP) ............................. 2004-144059

(51) Int. Cl.
*G05B 23/02* (2006.01)
(52) U.S. Cl. .................. 340/3.7; 340/3.71; 340/825.69; 340/825.72
(58) Field of Classification Search ............... 340/3.7, 340/3.71, 825.69, 825.72, 3.4, 870.17; 455/343.1
See application file for complete search history.

(56) References Cited

U.S. PATENT DOCUMENTS

| | | | | |
|---|---|---|---|---|
| 6,714,559 | B1 * | 3/2004 | Meier | 370/449 |
| 7,046,163 | B2 * | 5/2006 | Macey | 340/825.72 |
| 2002/0070875 | A1 * | 6/2002 | Crumb | 340/825.69 |
| 2006/0099980 | A1 * | 5/2006 | Nielsen et al. | 455/507 |

FOREIGN PATENT DOCUMENTS

| | | |
|---|---|---|
| JP | 04-192996 | 7/1992 |
| JP | 08-182072 | 7/1996 |
| JP | 09-116980 | 5/1997 |
| JP | 11-289586 | 10/1999 |
| JP | 2002-168017 | 6/2002 |

* cited by examiner

*Primary Examiner*—Edwin C Holloway, III
(74) *Attorney, Agent, or Firm*—Rankin, Hill & Clark LLP

(57) ABSTRACT

It is an object of the invention to provide a radio remote controller system that, when power saving for a radio remote controller is realized by intermittently setting a data receivable period in the radio remote controller, can easily and flexibly change a length of a period for making it impossible to receive the radio data and reduce power consumption of the radio remote controller. A master set connected to a water heater main body by wire transmits monitor data $G(G_1, G_2, G_3)$ indicating an operation state of the water heater main body, which include transmission time information indicating the next time ($t_{14}$ at $G_1$, and $t_{17}$ at $G_2$) of transmission of the monitor data G, to a slave set serving as a radio remote controller. The slave set, which has received the monitor data G, comes into a "standby state" (slave set Rx and slave set Tx are OFF), in which power consumption is smaller than "data receivable state" (a slave set Rx is ON) and transmission and reception of radio data are impossible, until the next time of transmission of the monitor data G acquired from the monitor data ($T_{off1}, T_{off2}, T_{off3}$). When start time ($t_{13}, t_{16}$) for reception of monitor data has come, the slave set is switched from the "standby state" to the "data receivable state" to receive the monitor data G.

1 Claim, 6 Drawing Sheets

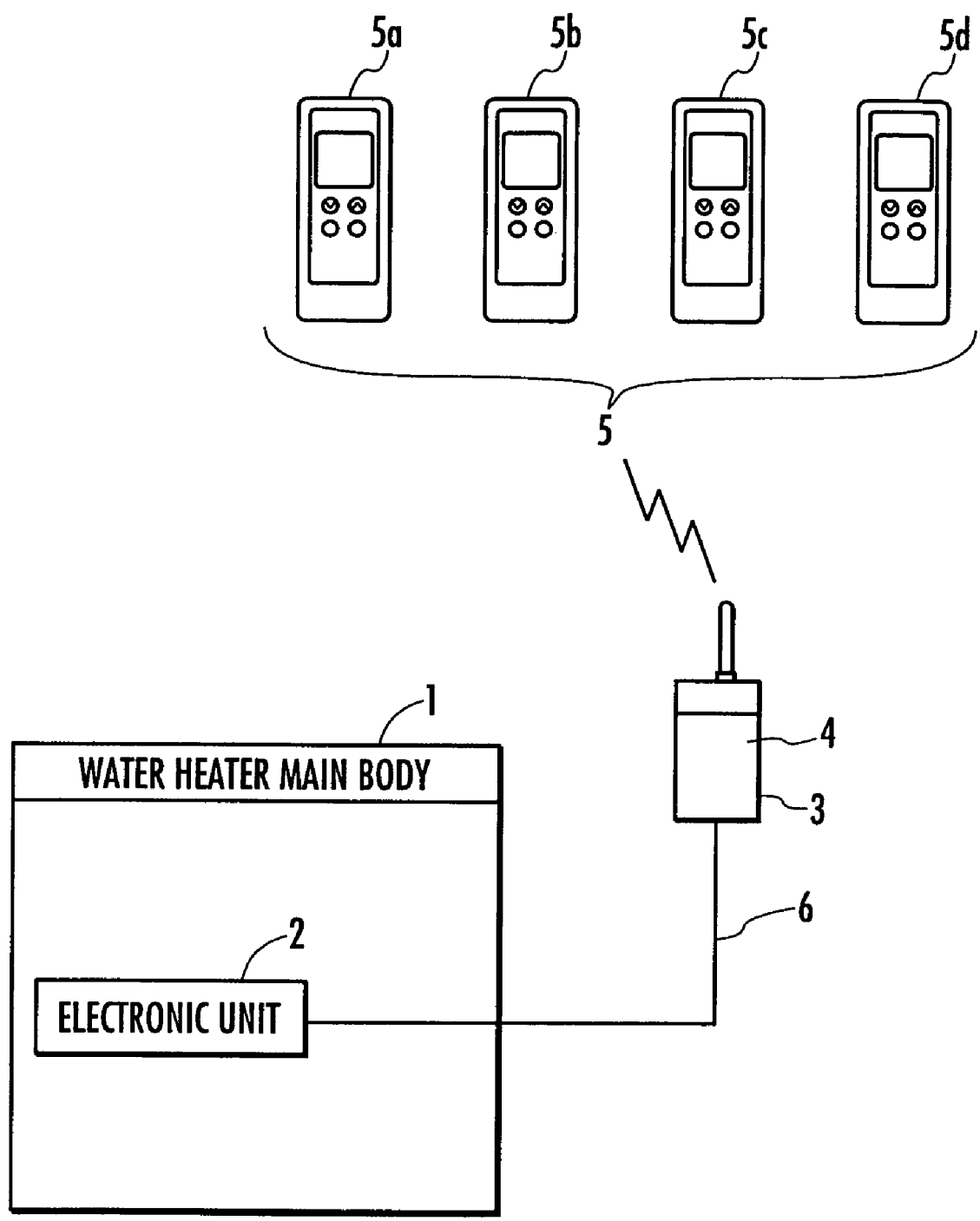

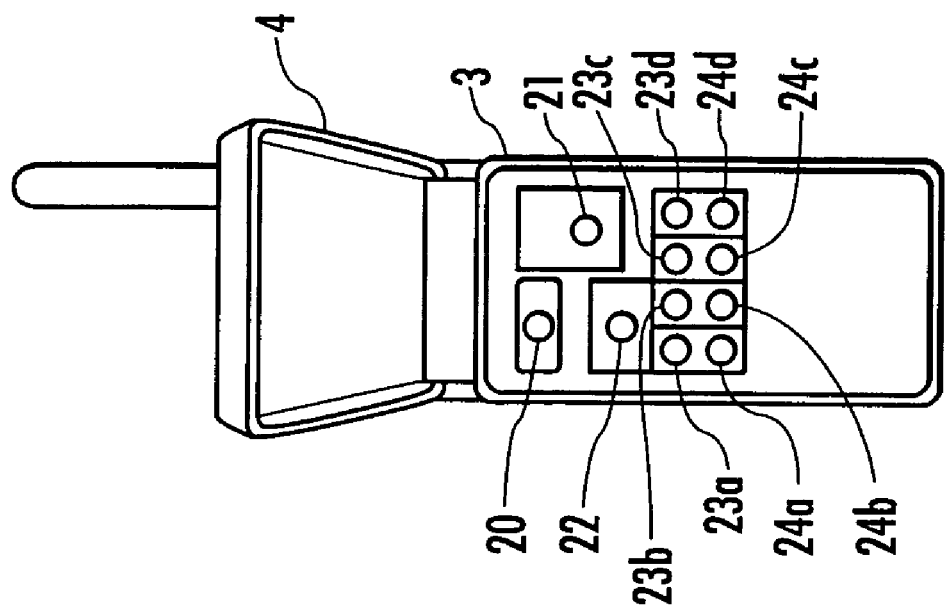
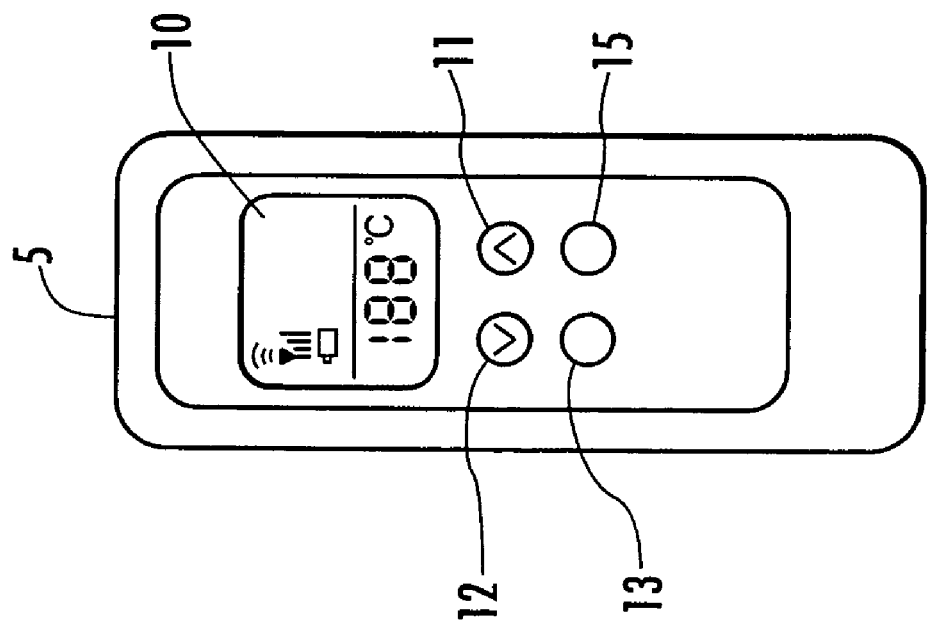

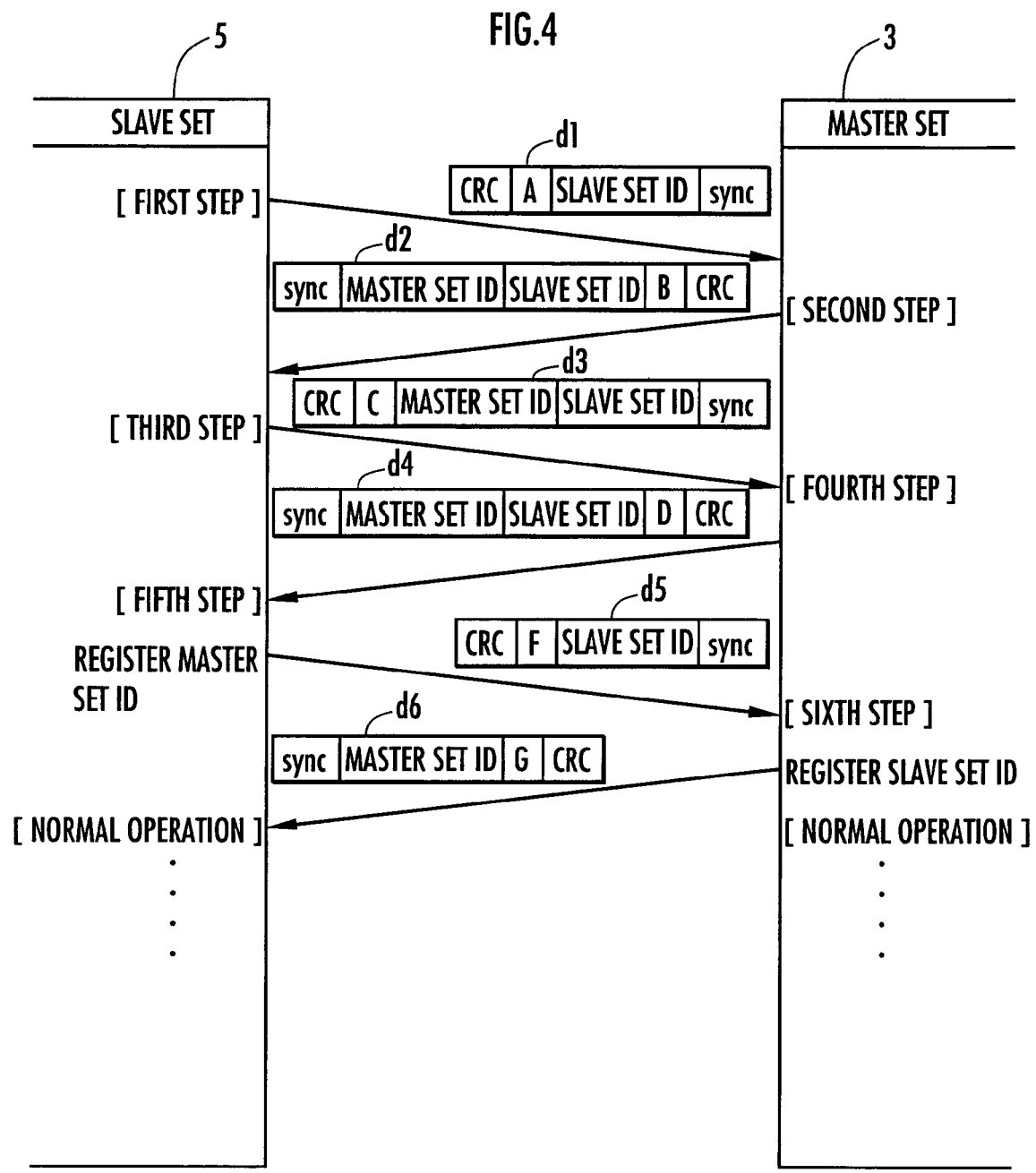

RADIO REMOTE CONTROL SYSTEM

BACKGROUND OF THE INVENTION

1. Field of the Invention

The present invention relates to a system that remotely controls a controlled apparatus using a radio remote controller and, more particularly, to power saving for the radio remote controller in the case in which monitor data is transmitted to the radio remote controller from the controlled apparatus.

2. Description of the Related Art

As an example of a system that remotely controls a controlled apparatus using a radio remote controller, there is known a hot water supply system that is adapted to remotely control a water heater main body using a radio remote controller. In the hot water supply system, power is supplied to a reception unit of the radio controller intermittently to realize power saving for the radio remote controller (see, for example, Japanese Patent Application Laid-Open No. 4-192996).

In such a hot water supply system, when a switch of the radio remote controller is operated, an interval from turning off power supply to the reception unit until turning on the power supply next is set as a first power OFF time. After that, when switching operation for the radio remote controller is not performed for a predetermined time or more, an interval from turning off the power supply to the reception unit until turning on the power supply next is set as a second power OFF time longer than the first power OFF time. This makes it possible to, when switching operation is performed, immediately receive monitor data indicating an operation state of a water heater that changes according to the operation. In addition, when switching operation is not performed, time for keeping the power supply off is extended to realize further power saving.

Here, in the conventional hot water supply system described above, the radio remote controller switches time for keeping the power supply to the reception unit off between the first power OFF time and the second power OFF time. When packet data transmitted from the radio remote controller is received, the water heater main body grasps that the first power OFF time and the second power OFF time is switched.

In this case, the water heater main body can grasp a length of time for keeping the power supply to the reception unit of the radio remote controller off (the first power OFF time or the second power OFF time). However, the water heater main body does not grasp time when the power supply is turned off. Therefore, when the water heater main body transmits monitor data to the radio remote controller at arbitrary timing, in order to make it possible to receive the monitor data on the radio remote controller side, the water heater main body transmits monitor data attached with a preamble exceeding the time for keeping the power supply off to the radio remote controller.

In this case, in order to set a length of the preamble to exceed the first power OFF time or the second power OFF time in the radio remote controller, the water heater main body is required to store data of the first power OFF time and the second power OFF time in the radio remote controller in a memory in advance. Thus, when the setting of the first power OFF time and the second power OFF time in the radio remote controller is changed, processing for changing the data of the first power OFF time and the second power OFF time stored in the memory is also required in the water heater main body.

Therefore, it is difficult to easily and flexibly change time for keeping power supply to the reception circuit of the radio remote controller off according to a form of use and design specifications of the water heater main body, a state of use of the radio remote controller, or the like to thereby realize further power saving for the radio remote controller.

SUMMARY OF THE INVENTION

The invention has been devised in view of such a background, and it is an object of the invention to provide a radio remote controller system that, when power saving for a radio remote controller is realized by intermittently setting a data receivable period in the radio remote controller, can easily and flexibly change a length of a period for making it impossible to receive the radio data and reduce power consumption of the radio remote controller.

The invention has been devised in order to attain the object and relates to an improvement of a radio remote control system, including: a controlled apparatus that has first radio communication means; and a radio remote controller that has second radio communication means, operating means, and display means, and performs data communication by radio with the controlled apparatus to remotely control the controlled apparatus; the controlled apparatus transmitting monitor data indicating an operation state of the controlled apparatus to the radio remote controller at predetermined timing and, when operation instruction data instructing operation of the controlled apparatus is received from the radio remote controller, operating the controlled apparatus according to the operation instruction data, and when the monitor data is received, the radio remote controller displaying an operation state of the controlled apparatus corresponding to the monitor data on the display means and, when the operating means is operated, transmitting the operation instruction data corresponding to the operation to the controlled apparatus.

The monitor data includes transmission start time information indicating next start time of transmission of the monitor data by the controlled apparatus, and the radio remote controller includes state switching means for, when the monitor data is received, setting the second radio communication means in a standby state, in which power consumption is smaller than a data receivable state and data reception is impossible, until start time of reception of monitor data set near the next start time of transmission of monitor data acquired from the monitor data unless the operating means is operated and, when the start time for reception of monitor data has come, switching the second radio communication means from the standby state to the data receivable state.

According to the invention described above, the monitor data transmitted from the controlled apparatus includes transmission start time information indicating time when the controlled apparatus starts transmission of the monitor data next. Therefore, when the monitor data is received, the radio remote controller can recognize the next start time of transmission of monitor data from the monitor data. In this case, the radio remote controller only has to be in a state in which monitor data transmitted from the controlled apparatus is receivable at the next start time of transmission of monitor data. Therefore, it is possible to control power consumption of the radio remote controller by switching the radio remote controller from the data receivable state to the standby state until the start time of reception of monitor data, which is set immediately before the next start time of transmission of monitor data, by the state switching means.

When the monitor data is received, the radio remote controller can grasp time when monitor data is transmitted from the controlled apparatus next. Therefore, it is unnecessary to recognize a transmission interval for monitor data in advance and the controlled apparatus can transmit monitor data to the radio remote controller at arbitrary time. Consequently, it is possible to easily and flexibly change a period in which the radio remote controller is set in the standby state according to a form of use and the like of the controlled apparatus to realize power saving for the radio remote controller.

The state switching means switches the second radio communication means to data transmittable state, in which data transmission is possible, when the operating means is operated in the standby state and switches the second radio communication means to the data receivable state when the transmission of the operation instruction data ends. When the operation instruction data is received, the controlled apparatus transmits new monitor data at the time when predetermined processing applied to the operation instruction data ends regardless of the next time of transmission according to transmission time information in the monitor data transmitted last time.

According to the invention described above, the state switching means switches the radio remote controller to the data receivable state when the transmission of the operation instruction data by the radio remote controller ends in the data transmittable state. Therefore, when the controlled apparatus transmits new monitor data at the time when predetermined processing applied to the operation instruction data ends to the radio remote controller, the radio remote controller can receive the monitor data and display an operation state of the controlled apparatus on the display means promptly. Consequently, in the radio remote controller, a response time from operation of the operating means until display of a change in a state of the controlled apparatus according to the operation on the display means is reduced. Thus, it is possible to improve convenience of use for a user.

BRIEF DESCRIPTION OF THE DRAWINGS

FIG. 1 is an overall diagram of a hot water supply system (a radio remote control system of the invention);

FIG. 2A is an external view of a slave set shown in FIG. 1;

FIG. 2B is an external view of a master set shown in FIG. 1;

FIG. 4 is a diagram explaining transmission and reception states between the master set and the slave set at the time when pairing processing is executed;

DETAILED DESCRIPTION OF THE PREFERRED EMBODIMENTS

Figure 3A:
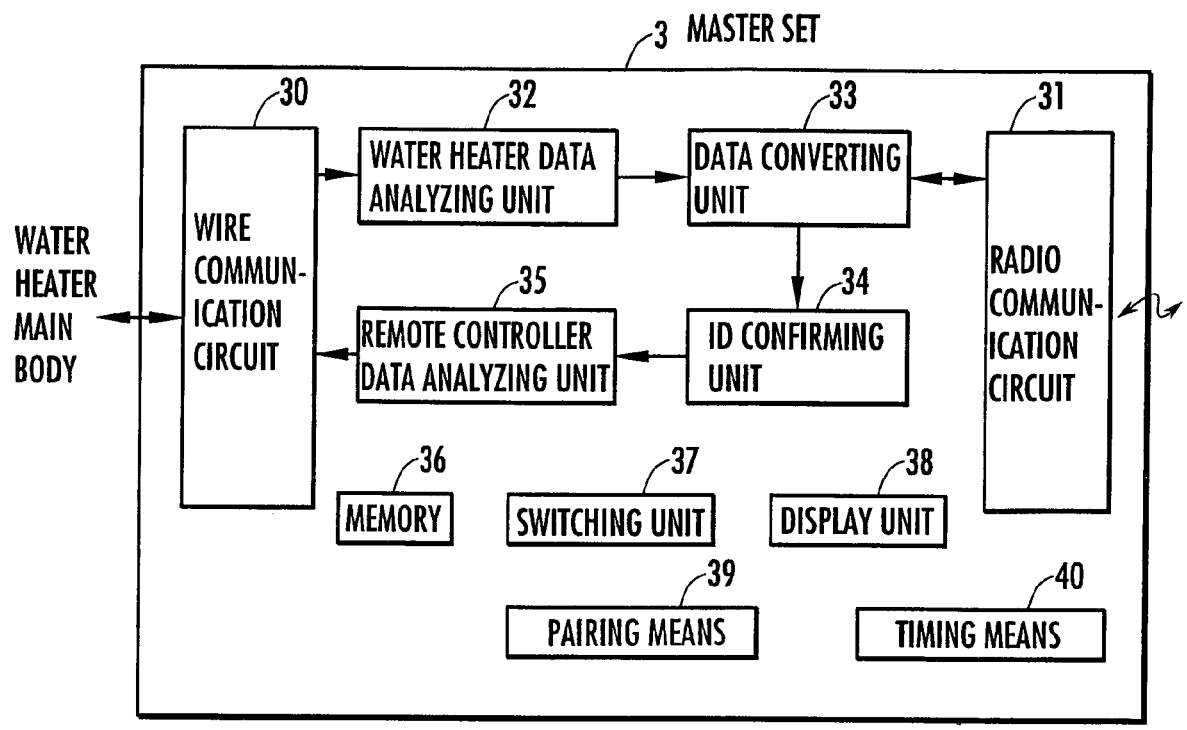
FIG. 3A is a diagram of the master set shown in FIG. 1.
Figure 3B:
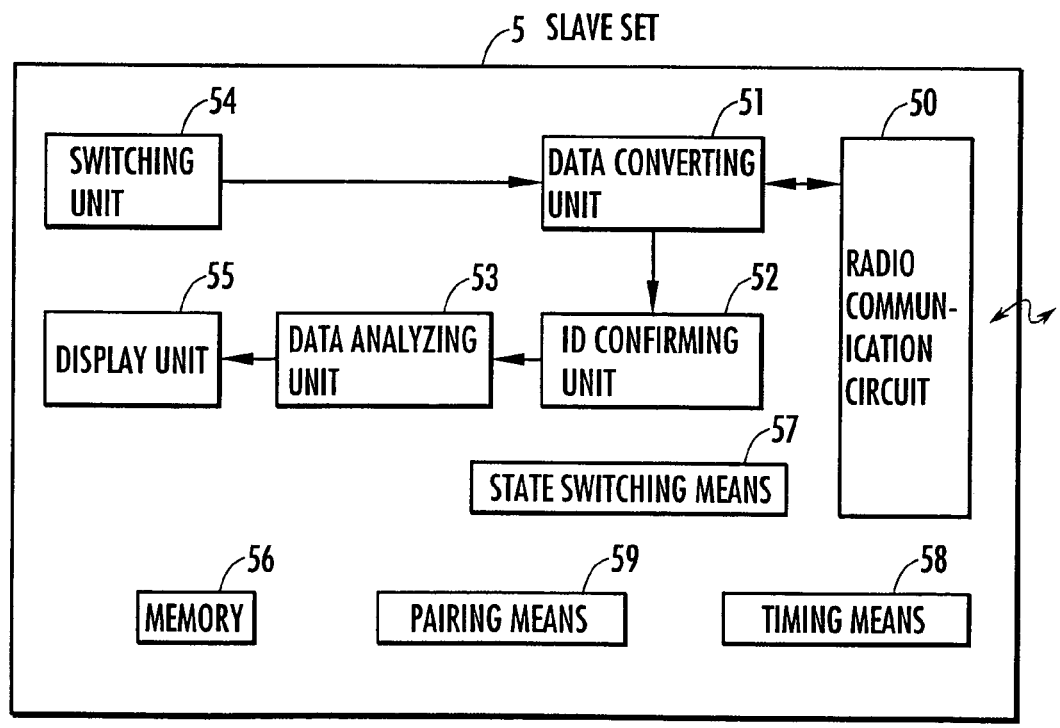
FIG. 3B is a diagram of the slave set shown in FIG. 1.
Figure 5:
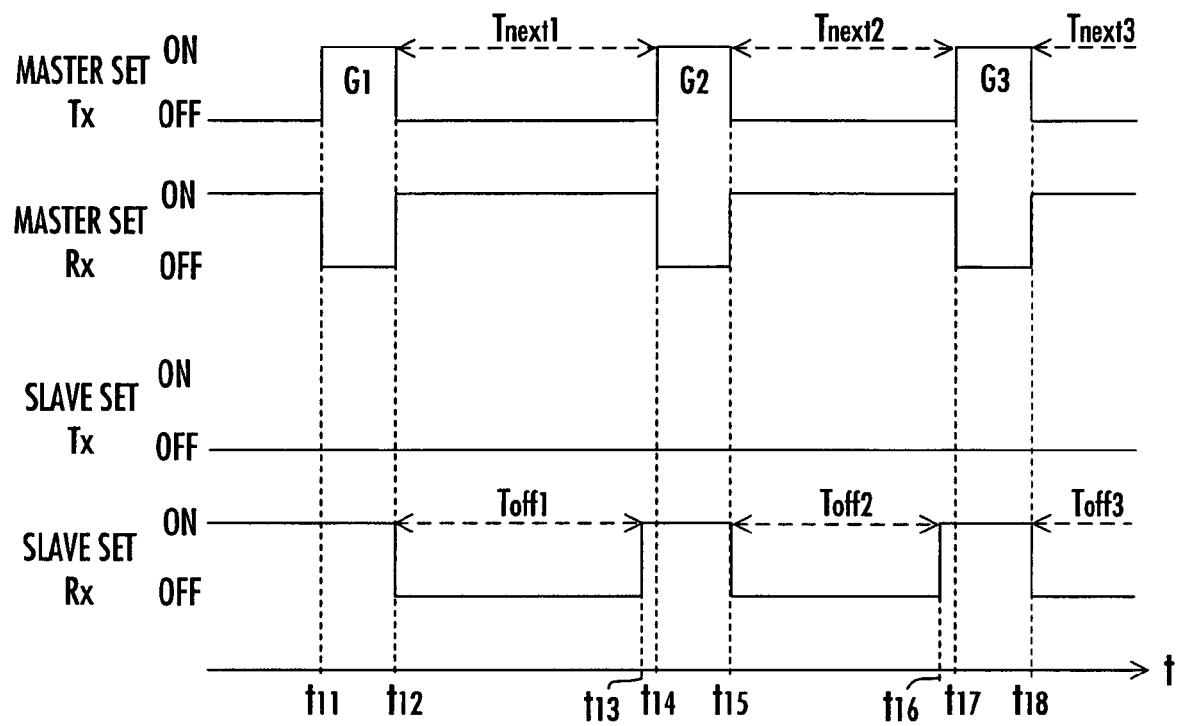
FIG. 5 is a timing chart of data communication between the master set and the slave set at the time when monitor data is transmitted from the master set.
Figure 6:
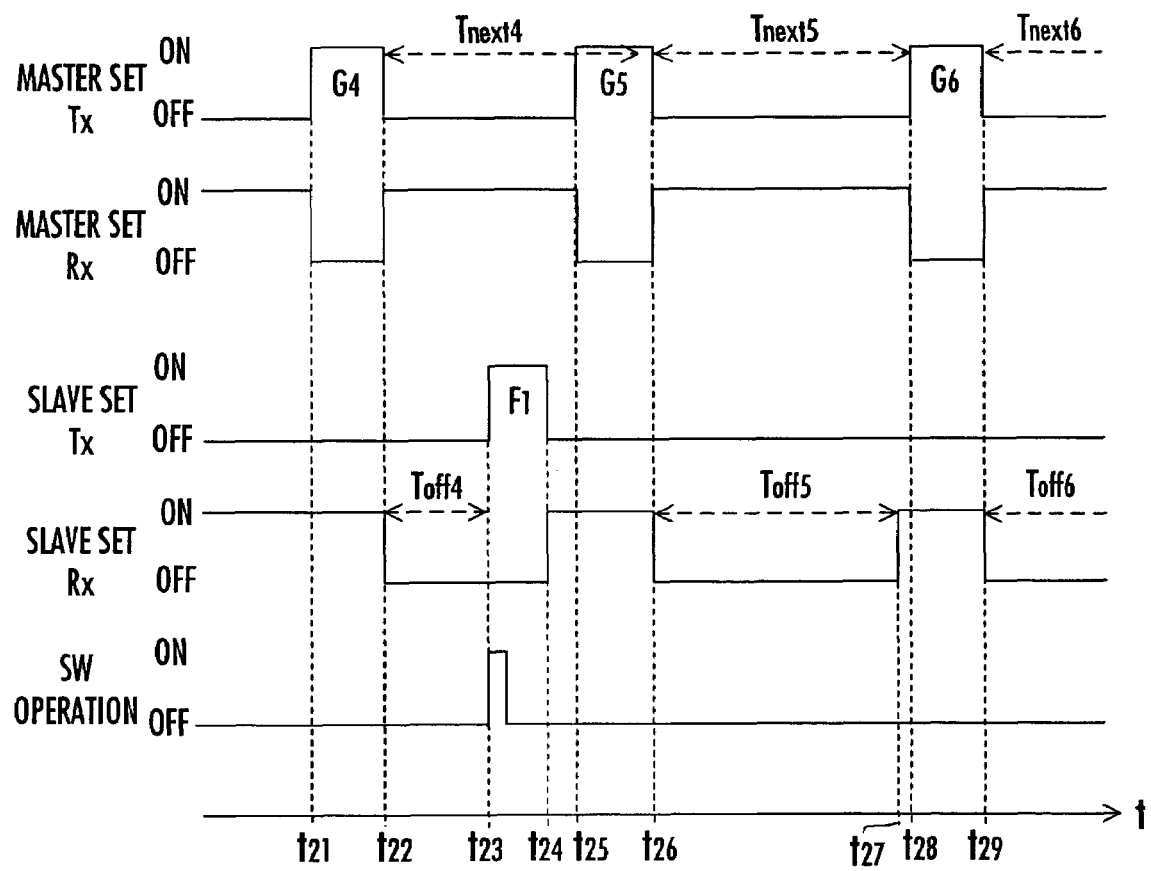
FIG. 6 is a timing chart of data communication between the master set and the slave set at the time when a switch of the slave set is operated.

An embodiment of the invention will be hereinafter explained with reference to the accompanying drawings. FIG. 1 is an overall diagram of a hot water supply system serving as a radio remote control system of the invention. FIG. 2A is an external view of a slave set shown in FIG. 1. FIG. 2B is an external view of a master set shown in FIG. 1. FIG. 3A is a diagram of the master set shown in FIG. 1. FIG. 3B is a diagram of the slave set shown in FIG. 1. FIG. 4 is a diagram explaining transmission and reception states of data between the master set and the slave set at the time when the pairing processing is executed. FIG. 5 is a timing chart of data communication between the master set and the slave set at the time when monitor data is transmitted from the master set. FIG. 6 is a timing chart of data communication between the master set and the slave set at the time when a switch of the slave set is operated.

Referring to FIG. 1, a water heater main body 1 is controlled by an electronic unit 2 including a microcomputer and a memory. The electronic unit 2 is connected to a master set 3 by a communication cable 6 so as to be capable of communicating with each other. Note that the controlled apparatus of the invention includes the water heater main body 1 and the master set 3. The master set 3 performs data communication by radio with slave sets 5 (5a to 5d) that are radio remote controllers for remotely operating the water heater 1. Note that unique ID codes are allocated to the master set 3 and the slave sets 5 in advance.

Next, referring to FIG. 2A, the slave set 5 includes a liquid crystal panel 10 (corresponding to the display means of the invention) for displaying set temperature for hot water supply, an operation state of the water heater main body, and the like, an operation switch 15 (corresponding to the operating means of the invention) for switching the water heater main body 1 to a "hot water supply operation state" in which hot water supply operation is possible and a "hot water supply standby state" in which hot water supply operation is impossible, an UP switch 11 (corresponding to the operating means of the invention) and a DOWN switch 12 (corresponding to the operating means of the invention) for setting hot water supply temperature, and a priority switch 13 (corresponding to the operating means of the invention) for setting the slave set 5 in a priority state in which setting for hot water supply temperature for the slave set 5 is performed preferentially over the other slave sets.

Referring to FIG. 2B, the master set 3 includes a cover 4, a registration switch 22 for instructing execution of "pairing processing" (details will be described later) for performing notification and registration of ID codes between the master set 3 and the slave set 5, and an upper limit temperature switch 21 for switching an upper limit value of settable hot water supply temperature between two kinds of temperature (e.g., 60° C. and 70° C.) set in advance.

The master set 3 is capable of performing data communication with the four slave sets 5 (5a to 5d) at the maximum. In order to apply registration of ID codes and release of the registration according to "pairing processing" to the four slave sets 5 individually, the master set 3 includes registration LEDs 23 (23a to 23d) and registration clear switches 24 (24a to 24d) for the four slave sets 5. The maser set 3 also includes an operation LED 20 for confirming an operation state (operating, stopped, occurrence of an error, etc.) of the water heater main body 1.

Next, referring to FIG. 3A, the master set 3 includes a wire communication circuit 30 that performs data communication by wire with the water heater main body 1 (see FIG. 1), a radio communication circuit 31 (corresponding to the first radio communication means of the invention) that performs data communication by radio with the slave set 5, a water heater data analyzing unit 32 that analyzes data received from the water heater main body 1, a data converting unit 33 that performs conversion of data formats of wire/radio, an ID confirming unit 34 that confirms an ID code included in received data and specifies the slave set 5 that is a communication partner, a remote controller data analyzing unit 35 that analyzes data received from the slave set 5, a memory 36 that stores an ID code of the master set 3, an ID code of the slave set 5, and the like, a switching unit 37 including the various switches shown in FIG. 2B and a switching interface circuit, a display unit 38 including the various LEDs shown in FIG. 2B and a display interface circuit, pairing means 39 that executes the "pairing processing" between the master set 3 and the slave set 5, and timing means 40 for determining transmission and reception timing and the like of data, and the like.

Referring to FIG. 3B, the slave set 5 includes a radio communication circuit 50 (corresponding to the second radio communication means of the invention) that performs data communication by radio with the master set 3, a data converting unit 51 that converts data formats of wire/radio, an ID confirming unit 52 that confirms an ID code included in received data and specifies the master set 3 that is a communication partner, a data analyzing unit 53 that analyzes data received from the master set 3, a switching unit 54 including the various switches shown in FIG. 2A and a switching interface circuit, a display unit 55 including the LCD panel 10 shown in FIG. 2A and a display interface circuit, a memory 56 that stores an ID code of the slave set 5, an ID code of the master set 3, and the like, pairing means 59 that executes the "pairing processing" between the slave set 5 and the master set 3, and timing means 58 for determining transmission and reception timing and the like of data.

The slave set 5 includes state switching means 57 for switching the radio communication circuit 50 to a "data transmissible state" in which transmission of radio data is possible, a "data receivable state" in which reception of radio data is possible, and a "standby state" in which both transmission and reception of radio data are impossible. Here, power consumption in the radio communication circuit 50 becomes smaller in an order of the "data transmissible state", the "data receivable state", and the "standby state".

Next, with reference to FIG. 4, a procedure for executing the "pairing processing" between the master set 3 and the slave set 5 to register an ID code of the slave set 5 in the master set 3 and register an ID code of the master set 3 in the slave set 5 will be explained.

When a worker installing a hot water supply system operates the registration switch 22 (see FIG. 2B) of the master set 3, the pairing means 39 of the master set 3 starts the "pairing processing". Then, the pairing means 39 flashes the LED 23 corresponding to the slave set 5, an ID of which is not registered, among the registration LEDs 23a to 23d and stands by for "pairing application data" d1 transmitted from the slave set 5.

On the other hand, when the worker operates the operation switch 15 of the slave set 5, the pairing means 59 (see FIG. 3B) of the slave set 5 confirms whether an ID code of the master set 3 is already registered in the memory 56. When the ID code of the master set 3 is not registered, the pairing means 59 starts the "pairing processing".

Then, first, "pairing application data" d1, which includes an ID code of the slave set 5 (a slave set ID in the figure) and A information (A in the figure) notifying application for pairing, is transmitted from the slave set 5 to the master set 3 (first step). Note that data for synchronization (sync in the figure) is added to tops of respective data transmitted and received between the master set 3 and the slave set 5. CRC codes for error correction (CRC in the figure) are added to tails of the data.

Next, "pairing reception data" d2, which includes an ID code of the master set 3 (a master set ID in the figure), the slave set ID, and B information (B in the figure) notifying reception of pairing, is transmitted from the master set 3, which has received the "pairing application data" d1, to the slave set 5 (second step).

Next, "first pairing selection data" d3, which includes the slave set ID, the master set ID, and C information (C in the figure) notifying the master set 3 that the slave set 5 has selected the master set 3 as a communication partner, is transmitted from the slave set 5, which has received the "pairing reception data" d2, to the master set 3 (third step).

Next, "second pairing selection data" d4, which includes the master set ID, the slave set ID, and D information (D in the figure) notifying the slave set 5 that the master set 3 has selected the slave set 5 as a communication partner, is transmitted from the master set 3, which has received the "first pairing selection data" d3, to the slave set 5 (fourth step).

Here, at a stage when the slave set 5 receives the "second pairing selection data" d4, the slave set 5 and the master set 3 recognize that the slave set 5 and the master set 3 has selected each other as communication partners. Thus, the slave set 5 registers the ID code of the master set 3 and transmits "pairing completion data" d5 notifying the master set 3 that registration of the ID code of the master set 3 (the master set ID) is completed to the master set 3 (fifth step).

Then, according to reception of the "pairing completion data" d5, the master set 3, which has recognized completion of the registration of the ID code of the master set 3 on the slave set 5 side, registers the ID code of the slave set 5 (the slave set ID) (sixth step).

In this way, according to the first to the sixth steps, the registration of the ID code of the master set 3 in the slave set 5 is completed and the registration of the ID code of the slave set 5 in the master set 3 is completed. Consequently, thereafter, when the master set 3 transmits data including a master set ID, which is an own ID of the master set 3, to the slave set 5, the slave set 5 can recognize the master ID and specify the master set 3 as a communication partner. In addition, when the slave set 5 transmits data including a slave set ID, which is an own ID of the slave set 5, to the master set 3, the master set 3 can recognize the slave set ID and specify the slave set 5 as a communication partner. Note that, when plural slave sets 5 are used, the "pairing processing" explained above only has to be executed between the respective slave sets 5 and the master set 3.

Then, the master set 3 transmits monitor data indicating an operation state of the water heater main body 1 to the slave set 5 periodically. In FIG. 5, a master set Tx signal is ON and a master set Rx signal is OFF when the master set 3 is in the "data transmissible state" and a master set Rx signal is ON and a master set Tx signal is OFF when the master set 3 is in the "data receivable state". Similarly, a slave set Tx signal is ON and a slave set Rx signal is OFF when the slave set 5 is in the "data transmissible state" and a slave set Rx signal is ON and a slave set Tx signal is OFF when the slave set 5 is in the "data receivable state".

In addition, when the slave set 5 is neither in the "data transmissible state" nor the "data receivable state" (both the slave set Tx signal and the slave set Rx signal are OFF), power supply to the radio communication circuit 50 and the like is cut off by the state switching means 57. Consequently, the slave set 5 comes into the "standby state" in which transmission and reception of radio data are impossible and power consumption is smaller than that in the "data transmissible state" and the "data receivable state".

Here, the master set 3 creates monitor data including transmission time information, which indicates time when monitor data (G ($G_1$, $G_2$, $G_3$) in the figure) are transmitted next, other than information on an operation state of the water heater main body 1 and transmits the monitor data to the slave set 5. Therefore, after time ($t_{11}$ to $t_{12}$) when the monitor data G1 is received first, the slave set 5 can acquire time ($t_{14}$, $t_{17}$, ... ) when the monitor data G($G_2$, $G_3$, ... ) are transmitted from the transmission time information included in the monitor data G.

Therefore, the state switching means 57 of the slave set 5 brings the radio communication circuit 50 into the "standby state" in periods ($T_{off1}$, $T_{off2}$, $T_{off3}$) from time ($t_{12}$, $t_{15}$, $t_{18}$, ... ) when reception of the monitor data G is completed until start time of reception of monitor data ($t_{13}$, $t_{16}$) that are set immediately before time when monitor data is transmitted next ($t_{14}$, $t_{17}$, corresponding to the start time of transmission of monitor data of the invention). Consequently, power consumption of the slave set 5 is reduced.

Then, the state switching means 57 resumes power supply to the radio communication circuit 50 at start time of reception of monitor data ($t_{13}$, $t_{16}$) and switches the radio communication circuit 50 from the "standby state" to the "data receivable state". The slave set 5 receives the monitor data G ($G_2$, $G_3$) transmitted from the master set 3.

Note that the transmission start time information included in the monitor data G may indicate intervals ($T_{next1}$, $T_{next2}$, $T_{next3}$ in the figure) from completion time of transmission of the monitor data G until the next start time of transmission of the monitor data G or may indicate the next start time of transmission of the monitor data G. Then, the state switching means 57 measures start time of reception of monitor data using the timing means 58 and performs switching from the "standby state" to the "data receivable state".

In this way, it is possible to change a length of the "standby state" in the slave set 5 arbitrarily and easily according to a change of the transmission time information included in the monitor data G transmitted from the master set 3. Therefore, it is unnecessary to store in the memory 56 data for switching the "standby state" to the "data receivable state" in synchronization with transmission timing of the monitor data G from the master set 3 in advance on the slave set 5 side.

Referring to FIG. 6, when the switch of the slave set 5 is operated to be changed over from OFF to ON ($t_{23}$ in the figure), the slave set 5 generates operation instruction data $F_1$ indicating operation instruction information for the water heater main body 1 according to a type of the switch changed over to ON. The state switching means 57 switches the radio communication circuit 50 from the "standby state" to the "data transmissible state". The slave set 5 transmits the operation instruction data $F_1$ to the master set 3. At $t_{24}$ when the transmission of the operation instruction data $F_1$ ends, the state switching means 57 switches the radio communication circuit 50 from the "data transmissible state" to the "data receivable state".

On the other hand, when the operation instruction data $F_1$ transmitted from the slave set 5 is received, the master set 3 recognizes contents of the operation instruction by the operation instruction data $F_1$ using the remote controller data analyzing unit 35 (see FIG. 3A). The master set 3 transmits data corresponding to the contents of the operation instruction to the water heater main body 1 via the radio communication circuit 30 (see FIG. 3A). Consequently, the water heater main body 1 performs predetermined processing corresponding to the operation instruction data $F_1$.

The master set 3, which has recognized that the predetermined processing by the water heater main body 1 ends, generates new monitor data $G_5$ indicating an operation state of the water heater main body 1 and transmits the monitor data $G_5$ to the slave set 5 ($t_{25}$ to $t_{26}$ in the figure). At this point, since the slave set 5 is in the "data receivable state", the slave set 5 can receive the monitor data $G_5$. Thus, the slave set 5 displays the operation state of the water heater main body 1 acquired from the monitor data $G_5$ on the display unit 55 immediately.

In this case, regardless of the next start time of transmission (time after elapse of $T_{next4}$ from $t_{22}$) of the monitor data G according to transmission start time information included in the monitor data $G_4$, the master set 3 transmits the monitor data $G_5$ to the slave set 5. Then, if the switch of the slave set 5 is not operated, the next start time of transmission of monitor data $G_6$ is time after elapse of $t_{next5}$ from $t_{26}$ indicated by transmission start time information included in the monitor data $G_5$.

Note that, when the switch of the slave set 5 is operated while the master set 3 is transmitting the monitor data G (the slave set 5 is receiving the monitor data G) to the slave set 5, the slave set 5 transmits the operation instruction data $F_1$ to the master set 3 when the transmission of the monitor data G ends.

Note that, in this embodiment, the hot water supply system, which remotely operates the water heater main body via the master set 3 using the radio remote controller 5, is described as the radio remote control system of the invention. However, it is possible to apply the invention to any system as long as the system remotely operates a controlled apparatus using a radio remote controller.

What is claimed is:

1. A radio remote control system, comprising:
   a controlled apparatus that has first radio communication means; and
   a radio remote controller that has second radio communication means, operating means, and display means, and performs data communication by radio with the controlled apparatus to remotely control the controlled apparatus;
   the controlled apparatus transmitting monitor data indicating an operation state of the controlled apparatus to the radio remote controller at predetermined timing and, when operation instruction data instructing operation of the controlled apparatus is received from the radio remote controller, operating the controlled apparatus according to the operation instruction data; and
   when the monitor data is received, the radio remote controller displaying an operation state of the controlled apparatus corresponding to the monitor data on the display means and, when the operating means is operated, transmitting the operation instruction data corresponding to the operation to the controlled apparatus; wherein
   the monitor data includes transmission start time information indicating next start time of transmission of the monitor data by the controlled apparatus, and
   the radio remote controller includes state switching means for, when the monitor data is received, setting the second radio communication means in a standby state, in which power consumption is smaller than a data receivable state and data reception is impossible, until start time of reception of monitor data set near the next start time of transmission of monitor data acquired from the monitor data unless the operating means is operated and, when the start time for reception of monitor data has come, switching the second radio communication means from the standby state to the data receivable state, wherein
   the state switching means switches the second radio communication means to data transmittable state, in which data transmission is possible, when the operating means is operated in the standby state and switches the second radio communication means to the data receivable state when the transmission of the operation instruction data ends, and when the operation instruction data is received, the controlled apparatus transmits new monitor data at the time when predetermined processing applied to the operation instruction data ends regardless of the next time of transmission according to transmission time information in the monitor data transmitted last time.

* * * * *